United States Patent
Knoll et al.

(10) Patent No.: US 11,772,804 B2
(45) Date of Patent: Oct. 3, 2023

(54) ELECTRIC TILTROTOR AIRCRAFT WITH OFFSET TILTING MOTORS

(71) Applicant: Bell Textron Inc., Fort Worth, TX (US)

(72) Inventors: Jonathan Andrew Knoll, Burleson, TX (US); George Matthew Thompson, Lewisville, TX (US); Charles Hubert Speller, Flower Mound, TX (US); Grant Michael Beall, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 179 days.

(21) Appl. No.: 17/148,273

(22) Filed: Jan. 13, 2021

(65) Prior Publication Data
US 2022/0219826 A1    Jul. 14, 2022

(51) Int. Cl.
*B64D 27/24* (2006.01)
*B64D 35/08* (2006.01)
*B64C 29/00* (2006.01)

(52) U.S. Cl.
CPC .......... *B64D 27/24* (2013.01); *B64C 29/0033* (2013.01); *B64D 35/08* (2013.01)

(58) Field of Classification Search
CPC ...... B64D 35/08; B64D 27/24; B64C 29/0033
See application file for complete search history.

(56) References Cited

U.S. PATENT DOCUMENTS

| | | | |
|---|---|---|---|
| 5,054,716 A | 10/1991 | Wilson | |
| 10,131,427 B2 | 11/2018 | Blyth et al. | |
| 2011/0024555 A1* | 2/2011 | Kuhn, Jr. | B64C 29/0033 244/17.11 |
| 2014/0248168 A1* | 9/2014 | Chantriaux | B64D 27/24 417/410.1 |
| 2021/0229802 A1* | 7/2021 | Karem | B64C 29/0033 |
| 2021/0276702 A1* | 9/2021 | Heironimus | B64C 27/14 |

FOREIGN PATENT DOCUMENTS

| | | |
|---|---|---|
| EP | 2353684 A2 | 8/2011 |
| EP | 3369652 A1 | 9/2018 |
| WO | 2010123601 A9 | 12/2010 |
| WO | 2016009824 A1 | 1/2016 |
| WO | 2017114643 A1 | 7/2017 |
| WO | 2019217920 A1 | 11/2019 |

OTHER PUBLICATIONS

EPO Search Report issued in EP Application 21207941.2 dated Apr. 12, 2022, 4 pages.

\* cited by examiner

*Primary Examiner* — Brady W Frazier
*Assistant Examiner* — Shanna Danielle Glover
(74) *Attorney, Agent, or Firm* — Akona IP

(57) ABSTRACT

A rotor system for an aircraft is described and includes an open rotor assembly comprising a plurality of rotor blades connected to a rotor mast; and a drive system for providing rotational energy to the open rotor assembly via the rotor mast. The drive system includes at least one electric motor for providing rotational energy to a motor shaft; and a gearbox connected to the drive shaft for receiving rotational energy from the at least one electric motor via the motor shaft and providing rotational energy to the rotor mast via a rotor shaft.

20 Claims, 5 Drawing Sheets

ELECTRIC TILTROTOR AIRCRAFT WITH OFFSET TILTING MOTORS

TECHNICAL FIELD

This disclosure relates in general to the field of tiltrotor aircraft and, more particularly, though not exclusively, to offset tilting motors for such aircraft.

BACKGROUND

An electric vertical takeoff and landing (eVTOL) is a type of aircraft that uses electric power to supply rotational energy in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric propulsion systems. One particular type of eVTOL is an electric tiltrotor aircraft.

SUMMARY

One embodiment is a rotor system for an aircraft, the rotor system including an open rotor assembly comprising a plurality of rotor blades connected to a rotor mast; and a drive system for providing rotational energy to the open rotor assembly via the rotor mast. The drive system includes at least one electric motor for providing rotational energy to a motor shaft; and a gearbox connected to the drive shaft for receiving rotational energy from the at least one electric motor via the motor shaft and providing rotational energy to the rotor mast via a rotor shaft.

Another embodiment is an aircraft comprising a rotor system, the rotor system comprising an open rotor assembly comprising a plurality of rotor blades connected to a rotor mast; and a drive system for providing rotational energy to the open rotor assembly via the rotor mast, the drive system comprising at least one electric motor for providing rotational energy to a motor shaft; and a gearbox connected to the drive shaft for receiving rotational energy from the at least one electric motor via the motor shaft and providing rotational energy to the rotor mast via a rotor shaft.

Yet another embodiment is a drive system for providing rotational energy to an open rotor assembly of a rotor craft. The drive system includes at least one electric motor for providing rotational energy to a motor shaft; and a gearbox connected to the drive shaft for receiving rotational energy from the at least one electric motor via the motor shaft and providing rotational energy to the open rotor assembly mast via a rotor shaft, wherein the motor shaft and the rotor shaft are parallel to and offset from one another; and wherein the at least one electric motor and the gear box are tiltable between a first position corresponding to an airplane mode of the aircraft and a second position corresponding to a helicopter mode of the aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
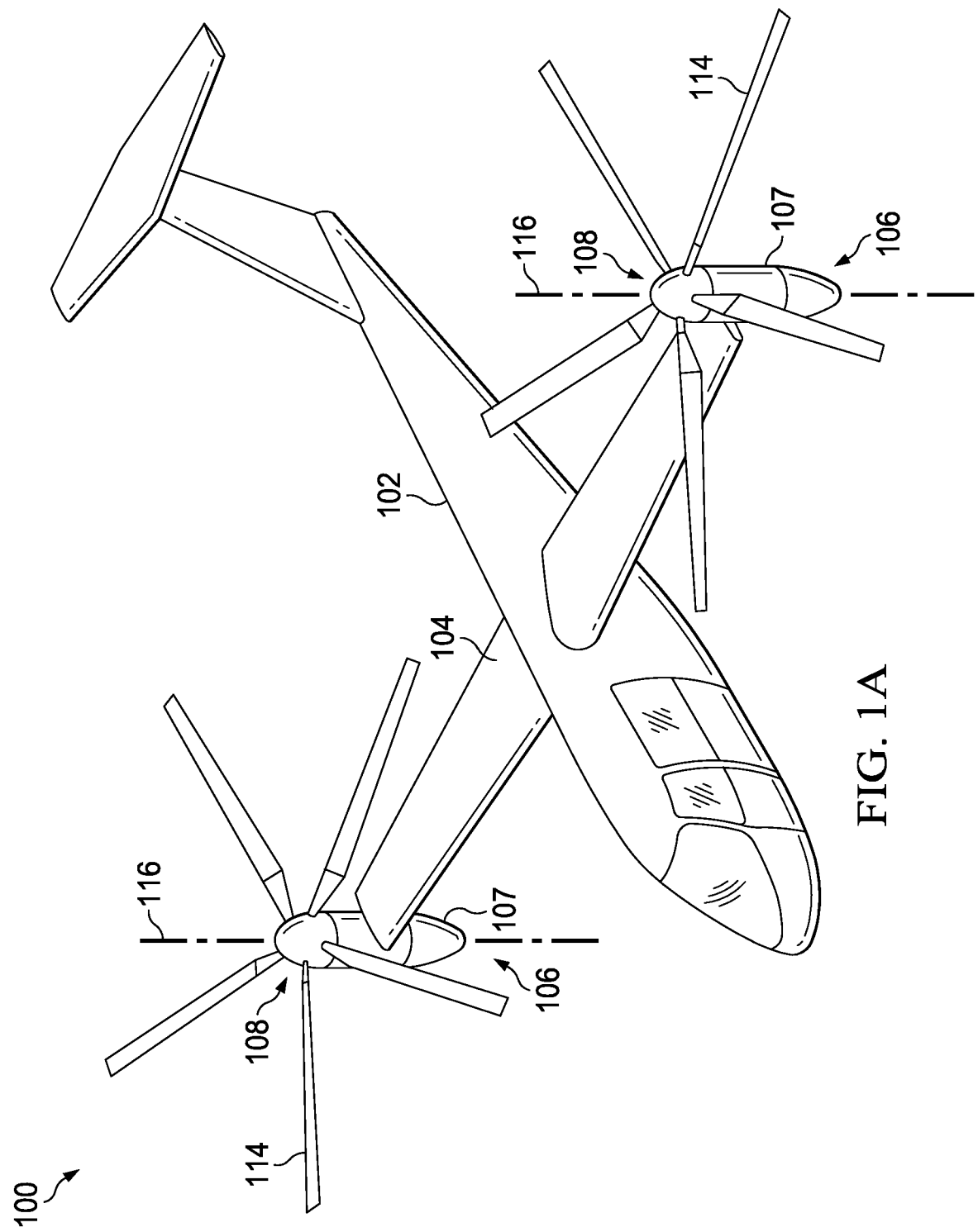
FIGS. 1A-1B illustrate an electric tiltrotor aircraft with offset tilting motors in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a drive system for an electric tiltrotor aircraft. In accordance with features of embodiments described herein, the drive system includes one or more tilting electric motors coupled to an off-axis tilting gearbox. Tilting of the motors and gearbox occurs with reference to a wing or other stationary structure of the aircraft.

Figure 1B:
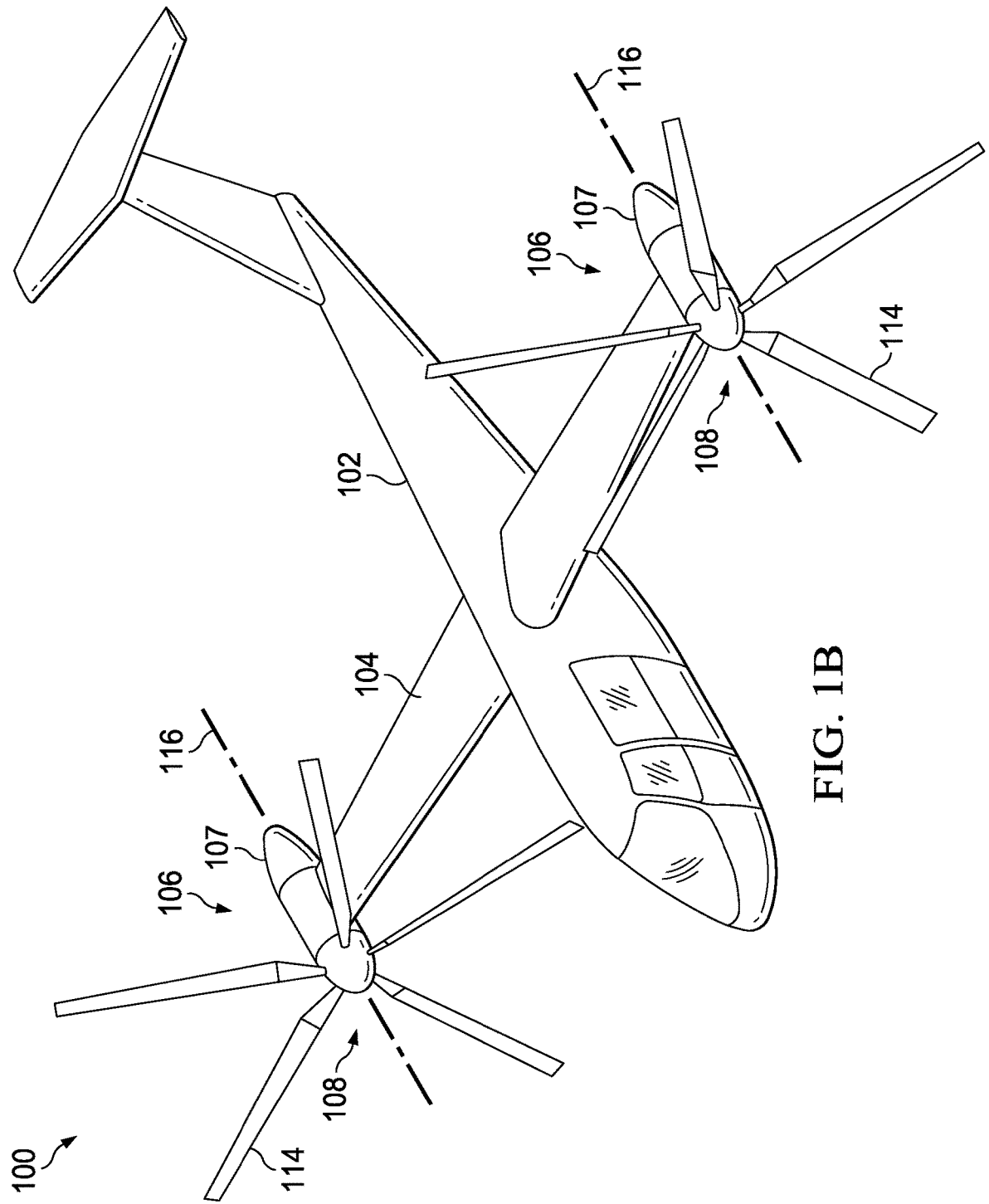

FIGS. 1A and 1B illustrate an example electric tiltrotor aircraft 100 that is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wing 104, and a propulsion assemblies 106 rotatably coupled to wing 104 on opposite sides of the fuselage 102. Each propulsion assembly 106 includes a nacelle or pylon 107 and an open rotor assembly 108 including a plurality of rotor blades 114 connected to a rotor mast (FIG. 2) and configured to rotate about a rotor axis 116. Rotation of rotor blades 114 about rotor axis 116 generates lift while operating in helicopter mode and thrust while operating in airplane mode. Each pylon 107 may house one or more electric motors therein configured to produce rotational energy that drives the rotation of rotor assembly 108. Alternatively, each pylon 107 may house a gearbox therein that drives the rotation of rotor assembly 108, wherein the gearbox receives rotational energy from a driveshaft.

The position of rotor assemblies 108, as well as the pitch of individual rotor blades 114, can be selectively controlled in order to selectively control direction, thrust, and lift of aircraft 100. Propulsion assemblies 106 are each convertible, relative to fuselage 102, between a vertical position, as shown in FIG. 1A, and a horizontal position, as shown in FIG. 1B. Propulsion assemblies 106 are in the vertical position during vertical takeoff and landing mode. Vertical takeoff and landing mode may be considered to include hover operations of aircraft 100. Propulsion assemblies 106 are in the horizontal position during forward flight mode, in which aircraft 100 is in forward flight. In forward flight mode, propulsion assemblies 106 direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion assemblies 106 may be tiltable between the vertical and horizontal positions by a rotatable shafts (not shown) extending through wing 104 on opposite sides of fuselage 102 that are rotatable in response to commands originating from a pilot and/or a flight control system. Each of the propulsion assemblies 106 utilizes an electric motor and gearbox unit (described below) disposed within a respective rotatable pylon 107 as a power source to rotate the respective rotor assembly 108 about rotor axis via a rotor mast.

Propulsion assemblies 106 are illustrated in the context of aircraft 100; however, propulsion assemblies 106 may be implemented on other types of tiltrotor aircraft. For example, an alternative embodiment may include a quad tiltrotor that has an additional wing member aft of wing 104 that can have additional propulsion assemblies similar to propulsion assemblies 106. In another embodiment, propulsion assemblies 106 may be implemented in connection with an unmanned version of aircraft 100. Further, propulsion assemblies 106 may be integrated into a variety of tiltrotor aircraft configurations.

Figure 2:
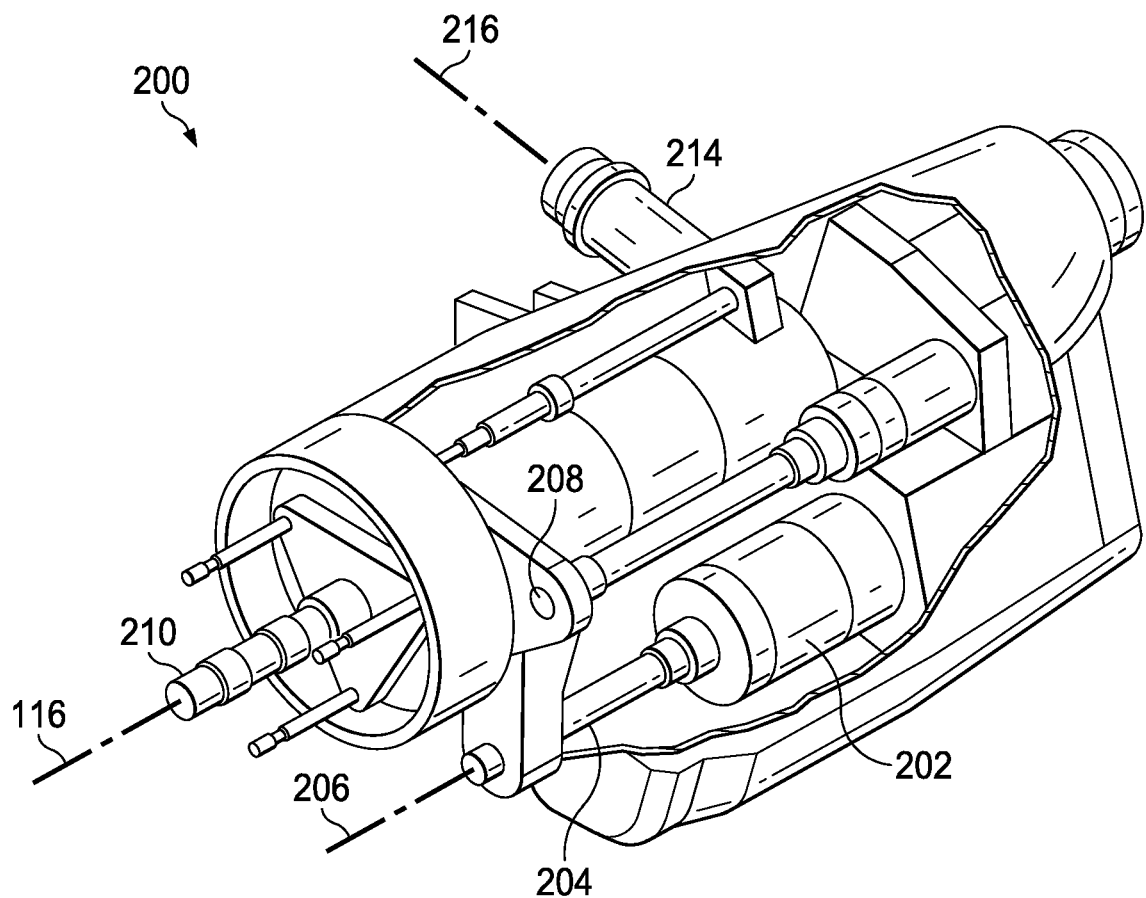
FIG. 2 illustrates an example drive system for rotor propulsion assemblies of aircraft shown in FIGS. 1A-1B.

As shown in FIG. 2, and as will be described in detail below, each of the propulsion assemblies 106 includes a drive system 200 disposed within the pylon 107 for use as a power source for rotating the rotor system 108 about the rotor axis 116. As shown in FIG. 2, the drive system 200 includes one or more electric motors 202 for rotating a motor shaft 204 about a motor axis 206. The drive system 200 further includes a gear box 208 for converting power from motor shaft 204 to drive a rotor shaft 210 about rotor axis 116. It will be recognized that rotor shaft 210 is connected to and provides rotational energy to rotor assembly 108 (FIGS. 1A and 1B). The pylon 107 is connected to end of wing 104 via a conversion spindle 214 which defines a tilt axis 216 about which the pylon 107, including the entire drive system 200, tilts between a vertical position (e.g., as shown in FIG. 1A) and a horizontal position (e.g., as shown in FIG. 1B). In accordance with features of embodiments described herein, and as illustrated in FIG. 2, rotor shaft 210/rotor axis 116 are offset from motor shaft 204/motor axis 206.

The configuration of drive system 200 illustrated in FIG. 2 provides flexibility in arrangement of electric motors 202. For example, as shown and described below, motors 202 may be configured as cylinders in series, stacked pancakes, or a flat pack and their arrangements can be selected to optimize center of gravity (CG) placement and/or to reduce conversion loads. The illustrated configuration also allows for interconnecting the drive shaft between rotors for added safety, as described in greater detail below with reference to FIG. 4.

Figure 3:
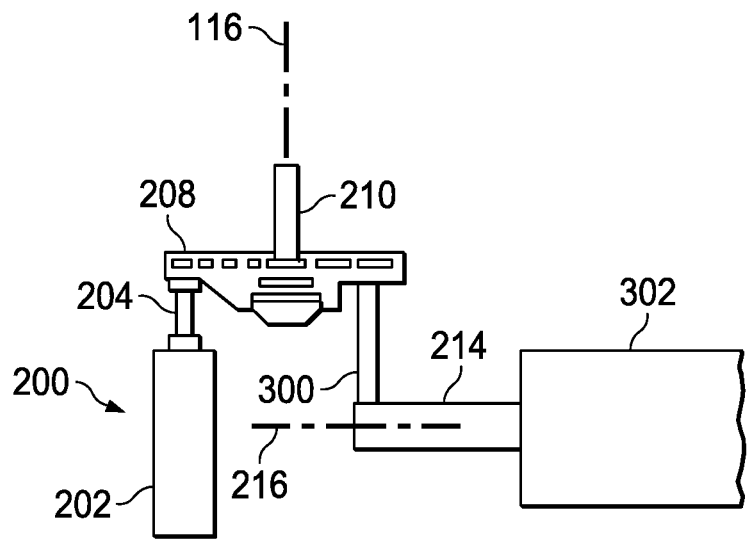
FIG. 3 is a schematic illustration of the example drive system shown in FIG. 2.

FIG. 3 is a schematic illustration of the drive system 200. As shown in FIG. 3, electric motors 202 are connected to gearbox 208 via motor shaft 204. In accordance with features of embodiments describe herein, gearbox 208 also drives a drive shaft 300 that connect to interconnect drive system 302 through conversion spindle 214.

Figure 4:
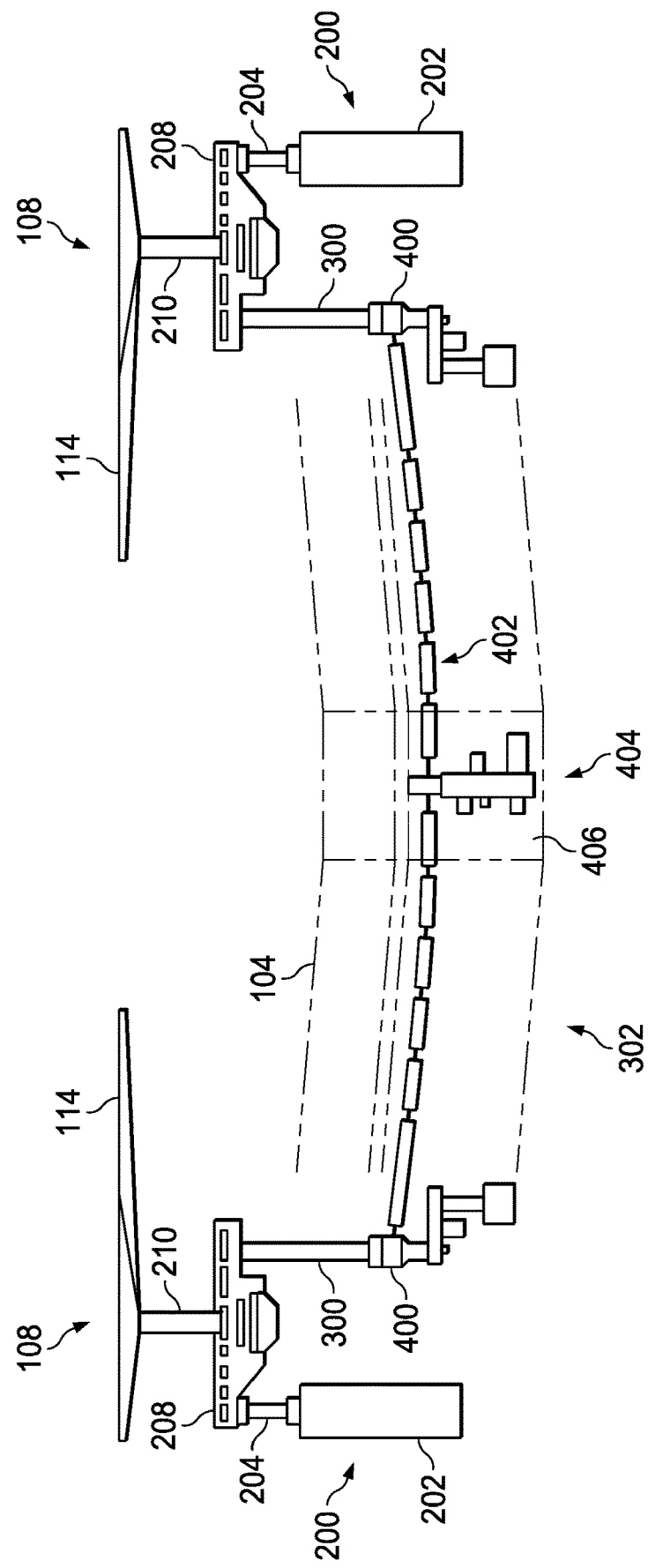
FIG. 4 is a schematic diagram of an example interconnect drive system of the aircraft of FIGS. 1A and 1B.

FIG. 4 is a schematic view of the interconnect drive system 302. As shown in FIG. 4, and as described above with reference to FIG. 3, gearbox 208 includes a drive shaft 300 that extends downwardly into a bevel gear pivot assembly 400 that forms a portion of conversion spindle 214 and serves as a pivot for the pylon 107 and also connects the drive shaft 300 with a shaft assembly 402 that extends across the wing 104 (shown in FIG. 4 in dashed lines). As shown in FIG. 4, the requirement for a plurality of bearings along the shaft assembly 402 is necessitated by the incremental construction of the shaft assembly as shown in FIG. 4. In particular, in the illustrated embodiment, the shaft assembly 402 is divided into segments, or increments, in order to accommodate the forward sweep of the wing 104, to accommodate the wing dihedral angle (not shown), and to accommodate the flexure of the wing 104 during operation of the aircraft 100. The number of increments, or segments, of shaft assembly 402 as shown in FIG. 4 is not meant to be limiting but shown for the purposes of illustration only. The exact number of increments necessary will be dependent on the sweep of the wing, the dihedral angle, and the amount of flexure needed. Each increment or segment of the shaft assembly 402 is connected to the next increment or segment so that the shaft assembly rotates as a single unit. A mid-wing gearbox assembly 404 is located in a mid-wing portion 406. The interconnect drive system 302 is configured to provide redundancy between drive systems 200, such that if one system fails, the other may be used to provide power to both rotor assemblies 108.

Figure 5A:
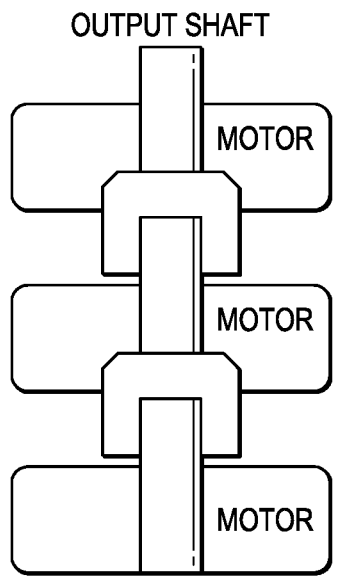
FIGS. 5A-5C illustrate example electric motor configurations for use in the drive system shown in FIG. 2.
Figure 5B:
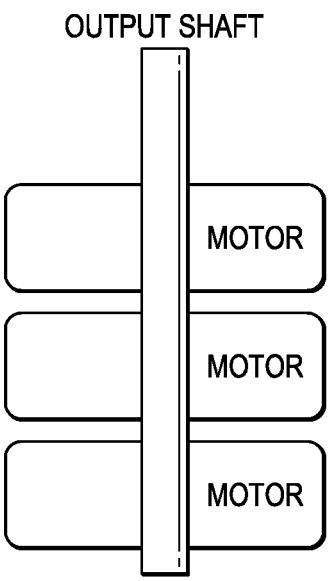
Figure 5C:
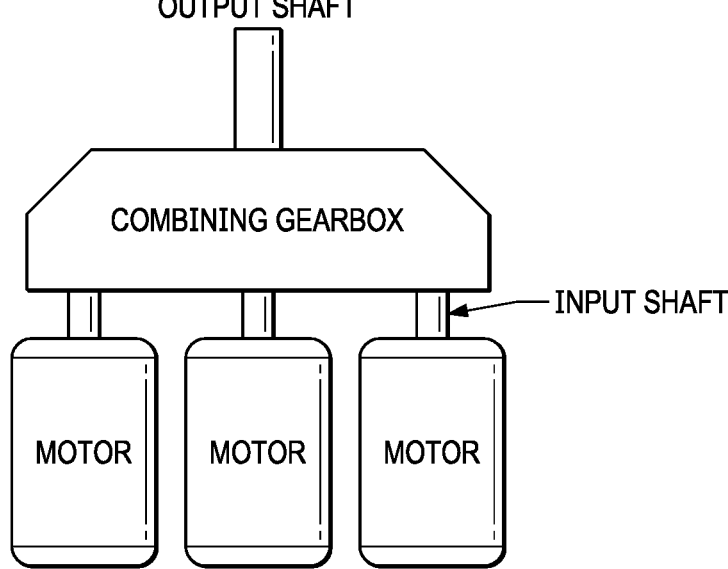

Referring now to FIGS. 5A-5C, as indicated above, motors may be configured as cylinders in series (FIG. 5A), stacked pancakes (FIG. 5B), or a flat pack (FIG. 5C). Referring first to FIG. 5A, in the series arrangement, motors are stacked in line with the output shaft of the first motor in the series engaging the input shaft of the next motor in the series. The shafts may be engaged with one another by way of splines or another appropriate method. Referring to FIG. 5B, in a pancake arrangement, multiple motors are stacked and engage a single output shaft. Motors can utilize different methods of engaging the output shaft, such as splines, bolted flanges, or other means. Finally, referring to FIG. 5C, in a flat pack arrangement, a combining gearbox is provided to combine inputs from the motors to a single output shaft.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies 108 may comprise any materials suitable for use with an aircraft rotor. For example, rotor blades 114 and other components may comprise carbon fiber, fiberglass, or aluminum; and rotor shafts 210 and other components may comprise steel or titanium. While rotor assemblies 108 are shown with five rotor blades 114, respectively, it should be understood that they may have as few as two rotor blades and may have more than five rotor blades. Still further, while only two rotor assemblies 108 are depicted, it will be recognized that embodiments described herein may be implemented in connection with any number of rotor assemblies.

Example 1 is a rotor system for an aircraft, the rotor system including an open rotor assembly comprising a plurality of rotor blades connected to a rotor mast; and a drive system for providing rotational energy to the open rotor assembly via the rotor mast, the drive system including at least one electric motor for providing rotational energy to a motor shaft; and a gearbox connected to the drive shaft for receiving rotational energy from the at least one electric motor via the motor shaft and providing rotational energy to the rotor mast via a rotor shaft.

In Example 2, the rotor system of Example 1 may further include the motor shaft and the rotor shaft being situated parallel to one another.

In Example 3, the rotor system of any of Examples 1 and 2 may further include the motor shaft and the rotor shaft being offset from one another.

In Example 4, the rotor system of any of Examples 1-3 may further include the at least one electric motor comprising a plurality of electric motors arranged as cylinders in series, wherein an output of a first one of the plurality of electric motors engages with an input of a next one of the plurality of electric motors.

In Example 5, the rotor system of any of Examples 1-4 may further include the at least one electric motor comprising a plurality of electric motors comprising a stacked pancake arrangement, wherein all of the plurality of electric motors engage with a single drive shaft.

In Example 6, the rotor system of any of Examples 1-5 may further include the at least one electric motor comprises a plurality of electric motors arranged as a flat pack, wherein outputs of the plurality of electric motors engage with inputs of a combining gearbox for driving a driveshaft.

In Example 7, the rotor system of any of Examples 1-6 may further include a pylon in which the drive system is housed.

In Example 8, the rotor system of any of Examples 1-7 may further include the pylon being rotatably connected to a wing of the aircraft.

In Example 9, the rotor system of any of Examples 1-8 may further include the pylon being tiltable between a first position corresponding to an airplane mode of the aircraft and a second position corresponding to a helicopter mode of the aircraft.

In Example 10, the rotor system of any of Examples 1-9 may further include the at least one electric motor and the gear box tilting together with the pylon between the first and second positions.

Example 11 is an aircraft including a rotor system, the rotor system including an open rotor assembly comprising a plurality of rotor blades connected to a rotor mast; and a drive system for providing rotational energy to the open rotor assembly via the rotor mast, the drive system including at least one electric motor for providing rotational energy to a motor shaft; and a gearbox connected to the drive shaft for receiving rotational energy from the at least one electric motor via the motor shaft and providing rotational energy to the rotor mast via a rotor shaft.

In Example 12, the aircraft of Example 11 may further include the motor shaft and the rotor shaft being arranged parallel to one another.

In Example 13, the aircraft of any of Examples 11 and 12 may further include the motor shaft and the rotor shaft being offset from one another.

In Example 14, the aircraft of any of Examples 11-13 may further include the at least one electric motor comprising at least one of a plurality of electric motors arranged as cylinders in series, a plurality of electric motors arranged as stacked pancakes, and a plurality of electric motors arranged as a flat pack.

In Example 15, the aircraft of any of Examples 11-14 may further include a pylon in which the drive system is housed, the pylon rotatably connected to a wing of the aircraft.

In Example 16, the aircraft of any of Examples 11-15 may further include the pylon being tiltable between a first position corresponding to an airplane mode of the aircraft and a second position corresponding to a helicopter mode of the aircraft.

In Example 17, the aircraft of any of Examples 11-16 may further include the at least one electric motor and the gear box tilting together with the pylon between the first and second positions.

Example 18 is a drive system for providing rotational energy to an open rotor assembly of a rotor craft, the drive system including at least one electric motor for providing rotational energy to a motor shaft; and a gearbox connected to the drive shaft for receiving rotational energy from the at least one electric motor via the motor shaft and providing rotational energy to the open rotor assembly mast via a rotor shaft; wherein the motor shaft and the rotor shaft are parallel to and offset from one another; and wherein the at least one electric motor and the gear box are tiltable between a first position corresponding to an airplane mode of the aircraft and a second position corresponding to a helicopter mode of the aircraft.

In Example 19, the drive system of Example 18 may further include the at least one electric motor comprising at least one of a plurality of electric motors arranged as cylinders in series, a plurality of electric motors arranged as stacked pancakes, and a plurality of electric motors arranged as a flat pack.

In Example 20, the drive system of any of Examples 18 and 19 may further include the drive system being housed in a pylon rotatably connected to a wing of the rotorcraft.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system for an aircraft, the rotor system comprising:
    an open rotor assembly comprising a plurality of rotor blades connected to a rotor shaft; and
    a drive system for providing rotational energy to the open rotor assembly via the rotor shaft, the drive system comprising:
        a plurality of electric motors for providing rotational energy to a single motor shaft; and
        a gearbox having an input for receiving rotational energy from the electric motors via the motor shaft and providing rotational energy to the rotor shaft; and
    an interconnect drive shaft connected between the gearbox and a gearbox of a second rotor system, the interconnect drive shaft providing a torque path between the at least one electric motor and a rotor assembly of the second rotor system.

2. The rotor system of claim 1, wherein the motor shaft and the rotor shaft are situated parallel to one another.

3. The rotor system of claim 2, wherein the motor shaft and the rotor shaft are offset from one another.

4. The rotor system of claim 1, wherein the electric motors are arranged as cylinders in series, wherein an output of a first one of the plurality of electric motors engages with an input of a next one of the plurality of electric motors and an output of a final one of the plurality of electric motors comprises the motor shaft connected to the gear box.

5. The rotor system of claim 1, wherein the plurality of electric motors are arranged as stacked pancakes, wherein all of the plurality of electric motors engage with the motor shaft.

6. The rotor system of claim 1, wherein the plurality of electric motors are arranged as a flat pack, wherein outputs of the plurality of electric motors engage with inputs of a combining gearbox for driving the motor shaft.

7. The rotor system of claim 1 further comprising a pylon in which the drive system is housed.

8. The rotor system of claim 7, wherein the pylon is rotatably connected to a wing of the aircraft.

9. The rotor system of claim 8, wherein the pylon is tiltable between a first position corresponding to an airplane mode of the aircraft and a second position corresponding to a helicopter mode of the aircraft.

10. The rotor system of claim 9, wherein the plurality of electric motors and the gear box tilt together with the pylon between the first and second positions.

11. An aircraft comprising a rotor system, the rotor system comprising:
    an open rotor assembly comprising a plurality of rotor blades connected to a rotor shaft; and
    a drive system for providing rotational energy to the open rotor assembly via the rotor shaft, the drive system comprising:
        a plurality of electric motors for providing rotational energy to a single motor shaft; and
        a gearbox having an input for receiving rotational energy from the at least one electric motor via the motor shaft and providing rotational energy to the rotor shaft; and
        an interconnect drive shaft connected between the gearbox and a gearbox of a second rotor system, the interconnect drive shaft providing a torque path between the at least one electric motor and a rotor assembly of the second rotor system.

12. The aircraft of claim 11, wherein the motor shaft and the rotor shaft are situated parallel to one another.

13. The aircraft of claim 12, wherein the motor shaft and the rotor shaft are offset from one another.

14. The aircraft of claim 11, wherein the plurality of electric motors are arranged as cylinders in series, as stacked pancakes, or as a flat pack.

15. The aircraft of claim 11 further comprising a pylon in which the drive system is housed, the pylon rotatably connected to a wing of the aircraft.

16. The aircraft of claim 15, wherein the pylon is tiltable between a first position corresponding to an airplane mode of the aircraft and a second position corresponding to a helicopter mode of the aircraft.

17. The aircraft of claim 16, wherein the plurality of electric motors and the gear box tilt together with the pylon between the first and second positions.

18. A drive system for providing rotational energy to an open rotor assembly of a rotor craft, the drive system comprising:
    a plurality of electric motors for providing rotational energy to a single motor shaft; and
    a gearbox having an input for receiving rotational energy from the at least one electric motor via the motor shaft and providing rotational energy to the open rotor assembly via a rotor shaft;
    wherein the motor shaft and the rotor shaft are parallel to and offset from one another; and
    wherein the at least one electric motor and the gear box are tiltable between a first position corresponding to an airplane mode of the aircraft and a second position corresponding to a helicopter mode of the aircraft; and
    an interconnect drive shaft connected between the gearbox and a gearbox of a second rotor system, the interconnect drive shaft providing a torque path between the at least one electric motor and a rotor assembly of the second rotor system.

19. The drive system of claim 18, wherein the plurality of electric motors are arranged as cylinders in series, as stacked pancakes, or as a flat pack.

20. The drive system of claim 18, wherein the drive system is housed in a pylon rotatably connected to a wing of the rotorcraft.

* * * * *